(12) United States Patent
Radlinski et al.

(10) Patent No.: US 7,761,464 B2
(45) Date of Patent: Jul. 20, 2010

(54) DIVERSIFYING SEARCH RESULTS FOR IMPROVED SEARCH AND PERSONALIZATION

(75) Inventors: Filip Radlinski, Ithaca, NY (US); Susan T. Dumais, Kirkland, WA (US); Eric J. Horvitz, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 180 days.

(21) Appl. No.: 11/425,074

(22) Filed: Jun. 19, 2006

(65) Prior Publication Data
US 2007/0294225 A1 Dec. 20, 2007

(51) Int. Cl.
G06F 17/30 (2006.01)

(52) U.S. Cl. ............... 707/769; 707/706; 707/708; 707/771

(58) Field of Classification Search ............ 707/2–6, 707/769, 706, 708, 77, 1
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,353,398 B1 | 3/2002 | Amin et al. | |
| 6,397,212 B1 | 5/2002 | Biffar | |
| 6,466,232 B1 | 10/2002 | Newell et al. | |
| 6,513,046 B1 | 1/2003 | Abbott, III et al. | |
| 6,539,377 B1 | 3/2003 | Culliss | |
| 6,549,915 B2 | 4/2003 | Abbott, III et al. | |
| 6,625,595 B1 * | 9/2003 | Anderson et al. | 707/3 |
| 6,672,506 B2 | 1/2004 | Swartz et al. | |
| 6,741,188 B1 | 5/2004 | Miller et al. | |
| 6,747,675 B1 | 6/2004 | Abbott et al. | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |

(Continued)

FOREIGN PATENT DOCUMENTS

WO 9800787 1/1998

OTHER PUBLICATIONS

Andy Harter, et al., A Distributed Location System for the Active Office, IEEE Network, 1994, pp. 62-70.

(Continued)

*Primary Examiner*—Mohammad Ali
*Assistant Examiner*—Thuy (Tiffany) Bui
(74) *Attorney, Agent, or Firm*—Wolf, Greenfield & Sacks, P.C.

(57) ABSTRACT

The claimed subject matter provides systems and/or methods that facilitate diversifying search results to improve searching and/or personalized searching. An interface component can receive a query. Additionally, a result diversification component can modify diversity of a set of search results obtained by a search engine in response to a query based at least in part upon one or more dimensions of diversity. The dimensions of diversity can include document topic, document type, document genre, domain of document, document age, location associated with the document, commercial characteristics of the document, user intent, and the like.

17 Claims, 11 Drawing Sheets

U.S. PATENT DOCUMENTS

| | | |
|---|---|---|
| 6,812,937 B1 | 11/2004 | Abbott et al. |
| 6,829,599 B2* | 12/2004 | Chidlovskii .................. 707/3 |
| 6,837,436 B2 | 1/2005 | Swartz et al. |
| 6,842,877 B2 | 1/2005 | Robarts et al. |
| 7,010,501 B1 | 3/2006 | Roslak et al. |
| 7,040,541 B2 | 5/2006 | Swartz et al. |
| 7,063,263 B2 | 6/2006 | Swartz et al. |
| 7,171,378 B2 | 1/2007 | Petrovich et al. |
| 7,195,157 B2 | 3/2007 | Swartz et al. |
| 7,385,501 B2 | 6/2008 | Miller et al. |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0032689 A1 | 3/2002 | Abbott, III et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0174230 A1 | 11/2002 | Gudorf et al. |
| 2003/0046401 A1 | 3/2003 | Abbott et al. |
| 2003/0154476 A1 | 8/2003 | Abbott, III et al. |
| 2004/0034652 A1 | 2/2004 | Hofmann et al. |
| 2004/0186827 A1* | 9/2004 | Anick et al. .................. 707/3 |
| 2004/0201500 A1 | 10/2004 | Miller et al. |
| 2004/0260680 A1 | 12/2004 | Best et al. |
| 2005/0034078 A1 | 2/2005 | Abbott et al. |
| 2005/0071328 A1* | 3/2005 | Lawrence ...................... 707/3 |
| 2005/0076003 A1 | 4/2005 | DuBose et al. |
| 2005/0102202 A1 | 5/2005 | Linden et al. |
| 2005/0102282 A1 | 5/2005 | Linden |
| 2005/0131866 A1 | 6/2005 | Badros et al. |
| 2005/0165743 A1 | 7/2005 | Bharat et al. |
| 2005/0175160 A1 | 8/2005 | Simpson et al. |
| 2005/0222989 A1* | 10/2005 | Haveliwala et al. ............. 707/3 |
| 2005/0240580 A1 | 10/2005 | Zamir et al. |
| 2005/0266858 A1 | 12/2005 | Miller et al. |
| 2005/0272442 A1 | 12/2005 | Miller et al. |
| 2005/0278317 A1 | 12/2005 | Gross et al. |
| 2006/0019676 A1 | 1/2006 | Miller et al. |
| 2007/0266002 A1* | 11/2007 | Chowdhury et al. ........... 707/2 |
| 2008/0090591 A1 | 4/2008 | Miller et al. |
| 2008/0091537 A1 | 4/2008 | Miller et al. |
| 2008/0161018 A1 | 7/2008 | Miller et al. |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, in Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In the 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

James Pitkow, et al. Personalized Search: A contextual computing approach may prove a breakthrough in personalized search efficiency. Communications of the ACM. Sep. 2002. pp. 50-55. vol. 45, No. 9.

Julia Luxenburger, et al. Query-Log Based Authority Analysis for Web Information Search. http://scholar.google.com/scholar?hl=en&lr=&q=cache:AO2LO__UUim0J:delis.upb.de/paper/DELIS-TR-137.pdf Last accessed on Mar. 2, 2006. pp. 1-14.

Michael Chau, et al. Personalized Spiders for Web Search and Analysis. Proceedings of the 1st ACM/IEEE-CS joint conference on Digital libraries. 2001. pp. 79-87. ACM Press. New York, NY, USA.

Personalized Search (Beta). http://browser.grik.net/https://www.google.com/accounts/ServiceLoginhl=en&continue=http://www.google.com/searchhistory&nui=1&service=hist Last accessed on Mar. 2, 2006. p. 1.

\* cited by examiner

DIVERSIFYING SEARCH RESULTS FOR IMPROVED SEARCH AND PERSONALIZATION

BACKGROUND

Technological advances associated with computers, the Internet and the World Wide Web have enabled users to instantly access a vast and diverse amount of information. As compared to traditional libraries or encyclopedias, information provided by way of the Web is decentralized in nature. To locate information of interest, a user can employ a search engine that facilitates finding content stored on local or remote computers. Search engines can assist in locating information on the public Web, intranets, personal computers, and the like. Typical search engines can retrieve a list of references (e.g., search results) matching inputted criteria provided by the user. For instance, the user can perform a query by providing a word or phrase to the search engine and in response the search engine can return a list of search results matching the entered word, phrase, or a portion thereof. To further specify search queries, many search engines support utilization of Boolean terms such as, for instance, AND, OR and NOT as well as provisions related to a distance between keywords.

Due to the quantity of available web pages, search engines attempt to provide relevant search results in response to receiving a query. For instance, search engines commonly rank web pages based upon popularity, relevance, or authoritativeness; thus, search engines can provide search results ordered according to such ranking. However, a set of search results yielded by the search engine and provided to a user may fail to include and/or provide a high ranking to results of interest to the user. For instance, if the search engine returns a limited number of results with the highest determined rankings, results of interest to the user may not be included in the limited set, and thus, further user input by way of manual refining of the query can be utilized. By way of illustration, the user can employ the search engine to find information associated with the band Traffic. Accordingly, a query can be performed with the word "traffic," which can yield a large number of results; however, a multitude of results related to automobile traffic in various locations, movies entitled Traffic, air traffic control, companies with the word traffic included in their names, and the like can be returned. Thus, the user may have to evaluate numerous results (e.g., by traversing through a number of pages including results, selecting hyperlinks associated with particular results, . . . ) in hopes of locating information associated with the band Traffic and/or manually narrow the original query (e.g., by way of refining the query to be "traffic band", . . . ) to obtain more relevant results.

The results provided by a search engine are typically the same for all disparate users. Search engines typically fail to differentiate disparate users and therefore do not take into account differing user needs, circumstances, interests, contexts, and the like. Accordingly, if two different users enter the same query, the search engine typically will provide the same search results regardless of differences in user interests, history, time, day, device effectuating the search, etc. However, as the amount of available content continues to increase, searching for information of interest can become more difficult and/or time consuming in view of typical search engines providing uniform results in response to the same query performed by disparate users with differing interests, contexts, etc.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that diversify search results for improved search and personalization. A diverse set of search results can be obtained in response to a query by employing various dimensions of diversity. The dimensions of diversity can be related to topics of documents, document types, document genres, domains of documents, ages of documents, locations associated with the documents, commercial characteristics of the documents, and/or user intents. A search engine can provide results corresponding to a query that can be constrained based upon considerations associated with one or more of the dimensions of diversity (e.g., limiting a number of results from a particular category and/or returned in response to a specified query).

In accordance with various aspects of the claimed subject matter, diversity can be yielded within a set of search results based upon a user intent. The user intent can be determined by analyzing query-query reformulation patterns that can include queries and corresponding reformulations of the queries. An obtained query can be modified to request results from the search engine associated with the original query in addition to results related to reformulations of the original query. The reformulations can be selected, for instance, by utilizing the k most frequent query reformulations. Additionally or alternatively, frequent but different reformulations can be employed; thus, a reformulation determined to be similar to a disparate reformulation can be excluded from being utilized by a search engine. Further, frequent and satisfying reformulations (e.g., reformulations that themselves tend to be infrequently reformulated) can be employed.

Pursuant to one or more aspects of the claimed subject matter, a set of diverse search results provides opportunities for performing subselection in a variety of ways so as to custom-tailor the results to different situations, informational goals, or users. Active diversification of items returned in an earlier phase in a process of providing search results enables downstream processes that may have access to more details about a user, goals, or a situation to identify and display in an appropriate manner appropriate results for the user, goals, or situation. In some cases, the best search results may be considered as varying by the short- or long-term interests of a computer user, and an understanding of these interests may be sought based on such evidence as that found in the user's personal store. Given a set of diversified results generated from data about the queries and search results of a large population of people, a system can be built that facilitates personalizing search results based upon a user's interests. Further, the personalization can be based upon a computing context, a history of previously encountered content and/or web pages, user interactions with content or applications, a profile of user interests, and/or demographic information. The set of diverse results can be personalized, for instance, by identifying a subset of the results to provide to the user, reordering the results, and the like. By increasing diversity within the set of search results obtained with a search engine, the likelihood that the set includes results of interest to a user can be increased.

According to various aspects of the claimed subject matter, a search server can facilitate personalizing search results. A bi-directional system can obtain data from client(s) that can be utilized in conjunction with profile and/or demographic information to enable personalizing search results for an end user. For instance, information associated with similar people can be utilized to build a model that facilitates personalizing search results so as to increase meaningfulness. Such a server based approach can allow for providing personalization at numerous locations with relative uniformity. Additionally or alternatively, a client side implementation can be employed in connection with the claimed subject matter.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
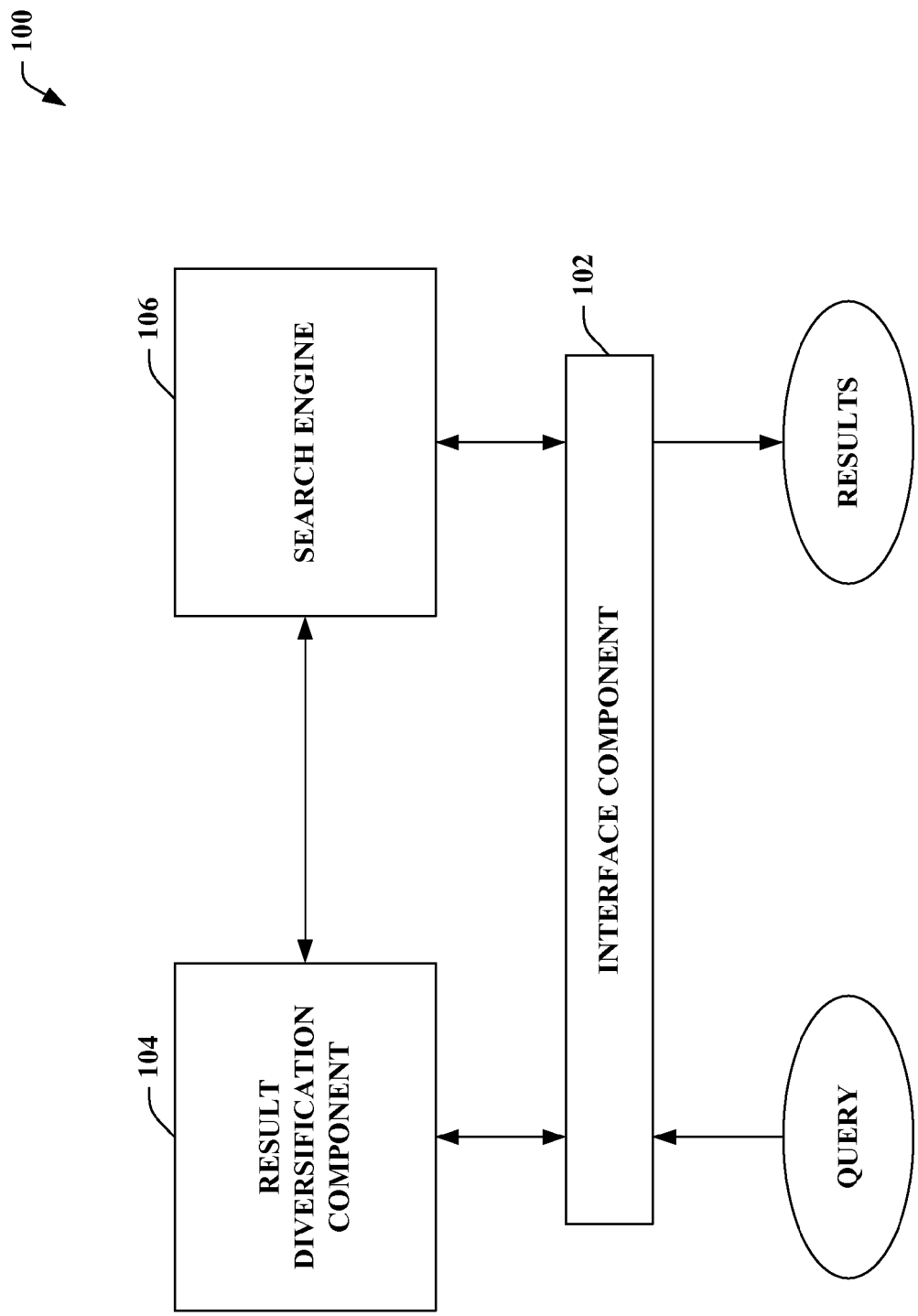
FIG. 1 illustrates a block diagram of an exemplary system that facilitates obtaining a diverse set of search results.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "search engine," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates obtaining a diverse set of search results. The system 100 includes an interface component 102 that receives a query and outputs a set of search results related to the query. The interface component 102 can provide the obtained query to a result diversification component 104 that modifies diversity within the set of search results obtained in response to the query by a search engine 106. The result diversification component 104 can facilitate generating such diversity by way of enforcing constraints related to one or more dimensions of diversity for the set of search results yielded by the search engine 106. Further, the interface component 102 can receive the set of search results generated by the search engine 106. The interface component 102 can thereafter provide the set of search results to a user (e.g., by way of a display, a graphical user interface, . . . ), a disparate component (not shown) that enables personalizing (e.g., outputting a subset of the search results, re-ranking the search results, . . . ) the diverse set of search results, etc.

It is to be appreciated that any type of query can be provided to the interface component 102 in connection with the claimed subject matter. For instance, the query can include keyword(s) (e.g., search terms such as a word, a phrase, . . . ), portion(s) of word(s) (e.g., with or without wildcards, . . . ), sound(s), image(s), and the like. Further, Boolean operators can be included in the queries. Moreover, it is contemplated that the query can limit the set of search results to include or exclude pages written in a particular language, from a geographic location, from a site or domain, linked to a disparate site, with a specified file format, updated at an indicated time, with a particular degree of popularity, and so on.

The result diversification component 104 can vary the amount of diversity associated with the set of search results. For instance, the result diversification component 104 can increase the diversity of the results to improve searching and/or personalized searching. By way of example, a set of search results (e.g., list of the top 50 results) returned by a traditional system employing a search engine in response to the query "traffic" may include results related to automobile traffic and air traffic control; meanwhile, results associated with the band Traffic may not be included in the set. According to this example, the results related to the band Traffic may have been ranked lower by the search engine in comparison to the returned results pertaining to automobile traffic and air traffic control. Therefore, if the user performing such query desires to find information associated with the band Traffic, she may have to manually narrow the query (e.g., provide an updated query such as "traffic band", . . . ).

In contrast, the result diversification component 104 can enable returning a more diverse set of search results. For instance, the result diversification component 104 can facilitate differentiating results based on a dimension of diversity related to document topics; thus, the result diversification component 104 can facilitate obtaining documents related to any number of disparate topics (e.g., by requesting that documents associated with a minimum of N disparate topics be included within the set of results where N can be any positive integer, . . . ) such as, for instance, news, society, business, music, movies, and the like. Accordingly, the set of search results yielded by employing the result diversification component 104 with the search engine 106 can include results associated with the band Traffic and the movie entitled Traffic in addition to the results related to automobile traffic and air traffic control. It is to be appreciated that the claimed subject matter is not limited to the aforementioned example.

The result diversification component 104 can effectuate obtaining a variety of results from the search engine 106 in any manner. For instance, the result diversification component 104 can obtain the query received by the interface component 102 and modify the query. Pursuant to an example, the query can be altered to request results varied based on any dimension of diversity such as, for instance, having any number of disparate topics, types, genres, domains, ages, locations, commercial characteristics, user intents, etc. Thus, according to the aforementioned example, a query for "traffic" obtained by the result diversification component 104 can be altered to request results for "traffic" with at least N different topics included in the set, where N can be any integer. Additionally or alternatively, the search engine 106 can be provided with the query as obtained by the interface component 102 and the result diversification component 104 can provide disparate data related to one or more dimensions of diversity, which can be employed by the search engine 106 in connection with generating the set of search results. For example, the result diversification component 104 can provide a constraint to the search engine 106 that requests a minimum number of disparate document types (e.g., web pages, news articles, .pdf files, .html files, sound files, picture files, video files, . . . ) to be included within the set of search results; however, the claimed subject matter is not so limited. The result diversification component 104 can enforce various constraints to generate variety within the set of results yielded by the search engine 106.

It is contemplated that a level of diversity within a set of search results generated by the result diversification component 104 can be manually and/or automatically modified. By way of illustration, the result diversification component 104 can obtain a user input (e.g., by way of the interface component 102, . . . ) that alters the level of diversity associated with the search results. Further, such user input can include information related to dimension(s) of diversity to employ, minimum number(s) of disparate categories of results included in the set of search results, and the like. According to another example, the result diversification component 104 can automatically diversify the set of search results. For instance, the result diversification component 104 can utilize a predetermined level of diversity that corresponds to utilizing certain dimension(s) of diversity, minimum number(s) of different categories of results provided in the set of search results, etc. Moreover, the result diversification component 104 can automatically adjust the diversity level within a set of search results, and therefore, effectuate corresponding modifications related to the dimension(s) of diversity employed and/or constraints pertaining to number(s) of differing categories.

Although the interface component 102 is depicted as being separate from the result diversification component 104 and the search engine 106, it is contemplated that the result diversification component 104 and/or the search engine 106 can include the interface component 102 or a portion thereof. Also, the interface component 102 can provide various adapters, connectors, channels, communication paths, etc. to enable interaction with the result diversification component 104 and/or the search engine 106. Further, although the result diversification component 104 and the search engine 106 are illustrated as being stand alone components, it is contemplated that the search engine 106 can comprise the result diversification component 104, or vice versa. Moreover, it is to be appreciated that the result diversification component 104 and/or the search engine 106 can be implemented on a server side, a client side, a combination thereof, etc.

Figure 2:
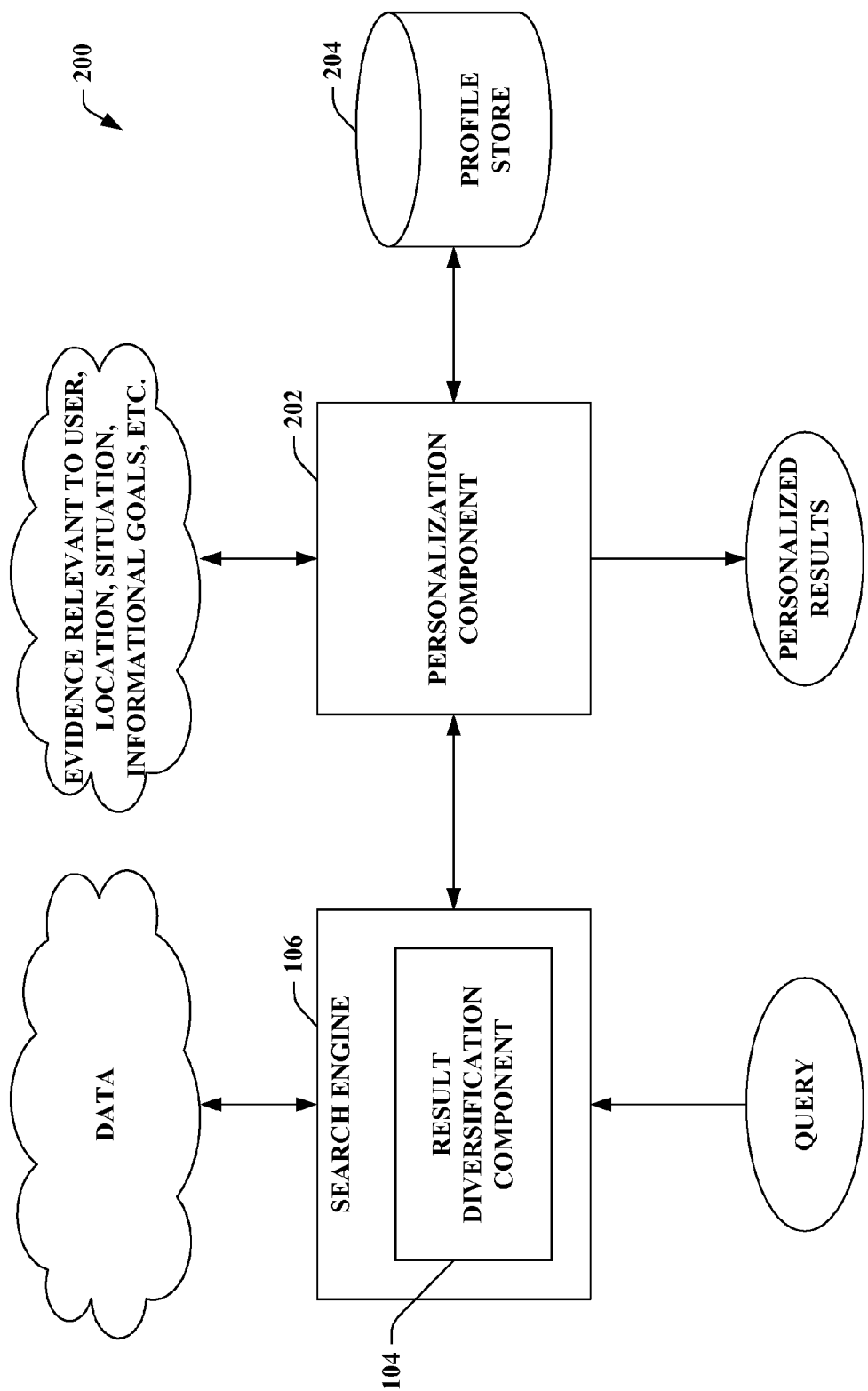
FIG. 2 illustrates a block diagram of an exemplary system that personalizes a diverse set of search results.

With reference to FIG. 2, illustrated is a system 200 that personalizes a diverse set of search results. The system 200 includes the search engine 106 that obtains a query (e.g., provided by a user, a disparate component (not shown), . . . ) and identifies data (e.g., documents, content, files, pages, . . . ) that matches the query. The data can be located locally and/or remotely. Further, the data identified by the search engine 106 can be from a personal computer, an intranet, the public Web, and the like. The search engine 106 can further include the result diversification component 104, which enables increasing diversity within a set of search results yielded by the search engine 106. The system 200 can additionally include a personalization component 202 that can obtain the diverse set of search results and generate personalized results. The personalization component 202 can facilitate personalizing search results for different users. The system 200 can further include a profile store 204 that can store information associated with personalizing the search results returned to a particular user.

The personalization component 202 can consider various factors in connection with generating the personalized results. Additionally, the personalization component 202 can employ a personalized re-ranking algorithm corresponding to a particular user. Further, the personalization component 202 can build and/or utilize a model (e.g., stored in the profile store 204, . . . ) pertaining to an individual user and/or a type of user that can facilitate personalizing search results so as to increase meaningfulness. The model built by the personalization component 202 can reflect a user's interests and can adapt to short-term and/or long-term changes in the user's interests. For example, the personalization component 202 can personalize the set of results for a particular user based upon a computing context, a history of previously encountered content and/or web pages/sites, user interactions, a profile of user interests (e.g., explicitly and/or implicitly obtained, . . . ), demographic information associated with the user, and the like.

By way of illustration, any number of results (e.g., 100 results) can be obtained by the personalization component 202 from the search engine 106. The personalization component 202 can reorder the results in a manner that optimizes appeal to the user based on information known about the user. The result diversification component 104 allows for obtaining results relevant to the user in the initial set provided by the search engine 106. In contrast, conventional techniques may provide a less diverse set of results. Accordingly, if a less diverse set of results is provided to the personalization component 202 by employing a typically system that uses a search engine, results of interest to a particular user may fail to be included, and thus, a probability of providing relevant results to the user may be diminished. For instance, if a query for "weather" is performed with a conventional search engine, weather results associated with the largest cities in the United States may be returned; however, if a user desires to find weather information associated with a small town in Maine, such results may not be included in the set of results. However, by employing the result diversification component 104, the set of results provided by the search engine 106 can include more variations; hence, a probability of a user finding relevant information in response to a query can be increased.

Figure 3:
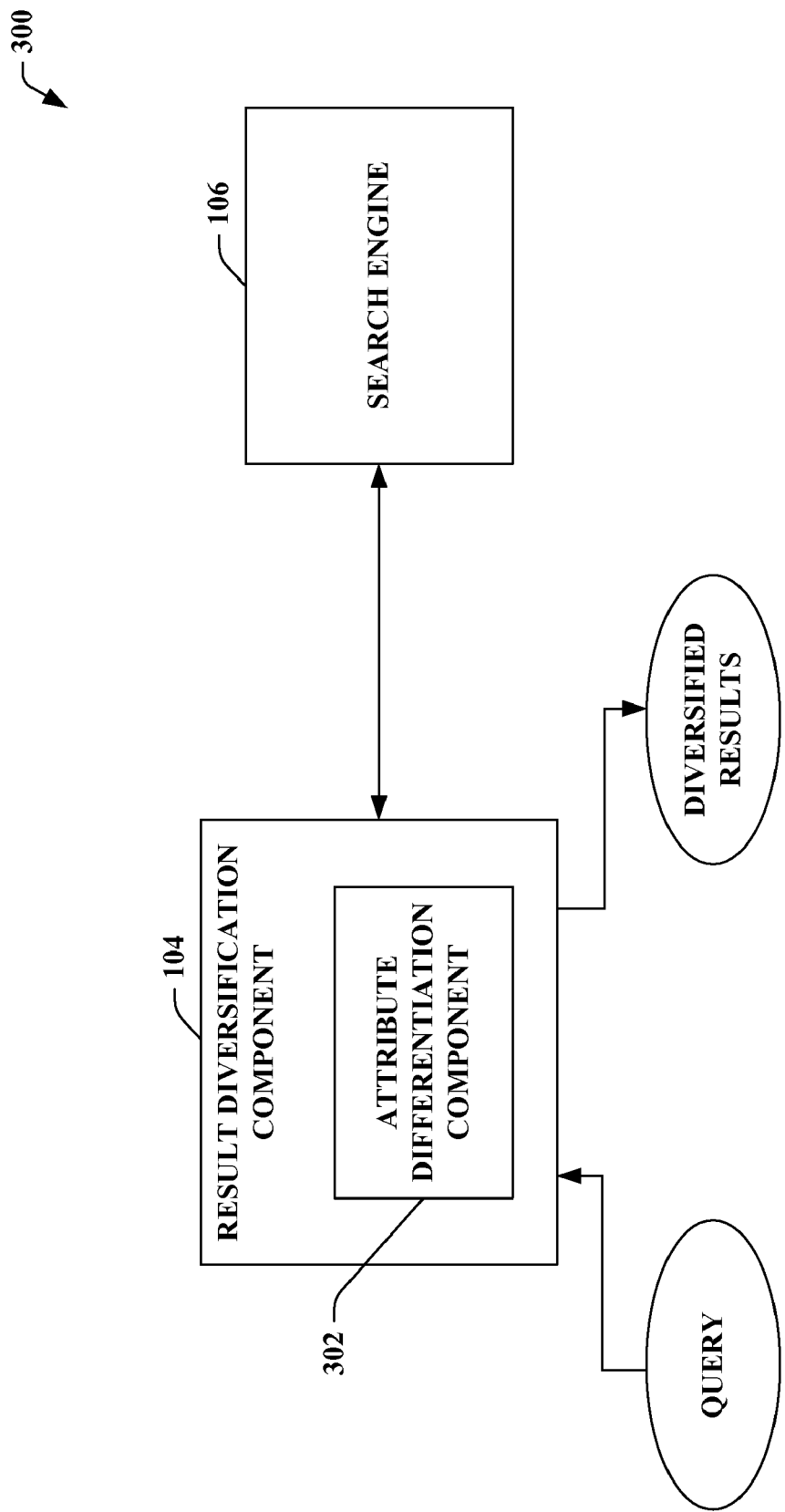
FIG. 3 illustrates a block diagram of an exemplary system that diversifies search results based at least in part upon one or more dimensions of diversity related to documents.

Turning to FIG. 3, illustrated is a system 300 that diversifies search results based at least in part upon one or more dimensions of diversity related to documents. The system 300 includes the result diversification component 104 and the search engine 106, each of which can be substantially similar to the aforementioned descriptions. The result diversification component 104 can obtain a query and utilize the search engine 106 to yield a set of search results. Additionally or alternatively, the query can be provided to the search engine 106 and/or the search engine 106 can output the results (not shown).

The result diversification component 104 can further include an attribute differentiation component 302 that provides variables (e.g., dimensions of diversity) upon which to distinguish documents to enable diversifying the results (e.g., related to the documents) obtained by the search engine 106. The document related variables can be provided by the attribute differentiation component 302 to the search engine 106, for instance. Thereafter, the search engine 106 can assemble a set of search results that are differentiated based upon the provided variable(s) (e.g., dimension(s) of diversity). Additionally or alternatively, the attribute differentiation component 302 can modify a received query to include constraints related to the diversifying variable(s) related to the documents. By way of illustration, the attribute differentiation component 302 can receive a query requesting 100 results and alter the query to continue to request 100 results, yet with a constraint that not more than 10 results can be returned from a particular topic; however, it is to be appreciated that the claimed subject matter is not limited to the aforementioned illustration.

According to an example, the attribute differentiation component 302 can facilitate diversifying the search results by utilizing a variable related to a topic of a document. Pursuant to this example, each web page can be associated with one or more topics such as, for instance, sports, computers, society, movies, music, news, etc. The attribute differentiation component 302 can enforce various constraints to limit a number of returned results pertaining to a particular topic.

Pursuant to a further illustration, the attribute differentiation component 302 can enable diversifying results based upon a document type. Accordingly, the attribute differentiation component 302 can facilitate including and/or limiting a number of web pages, news articles, .pdf files, .html files, sound files, picture files, video files, presentation files, etc. in the set of results. Additionally or alternatively, the attribute differentiation component 302 can differentiate documents based at least in part upon a consideration of a genre of a document (e.g., style of a document). Examples of different genres that can be represented in the set of diversified results can be an individual's homepage, a product selling page, a department homepage, and the like.

Moreover, the attribute differentiation component 302 can consider differences associated with sources of documents. By way of illustration, the source of a document can be the web, a news outlet, a local computer (e.g., local desktop, . . . ), a blog, and so on. Further, the attribute differentiation component 302 can enable identifying and distinguishing documents based upon readability (e.g., third grade reading level, technical document, . . . ). Pursuant to another example, a location variable associated with each document can be employed by the attribute differentiation component 302. For instance, one or more locations can be assigned to each document by scanning the document to evaluate whether location related information is included such as a zip code, city name, county, state, country, etc. Additionally or alternatively, respective IP addresses that server each document can be utilized to determine corresponding locations.

Additional variables utilized by the attribute differentiation component 302 can be a domain of a document, an age of the document, and/or whether the document is commercial in nature. For instance, the attribute differentiation component 302 can distinguish documents obtained from any domain such as yyy.com, zzzz.org, and the like. Moreover, the age (e.g., based at least in part upon a date of a last update, a time of posting, a date of creation, a date included in the document, . . . ) of the document can be utilized to provide some newer content along with older documents within the set of diversified results. Also, the attribute differentiation component 302 can consider commerciality of documents to enable mixing results reviewing a product, offering coupons for a product, and selling the product, for example.

Figure 4:
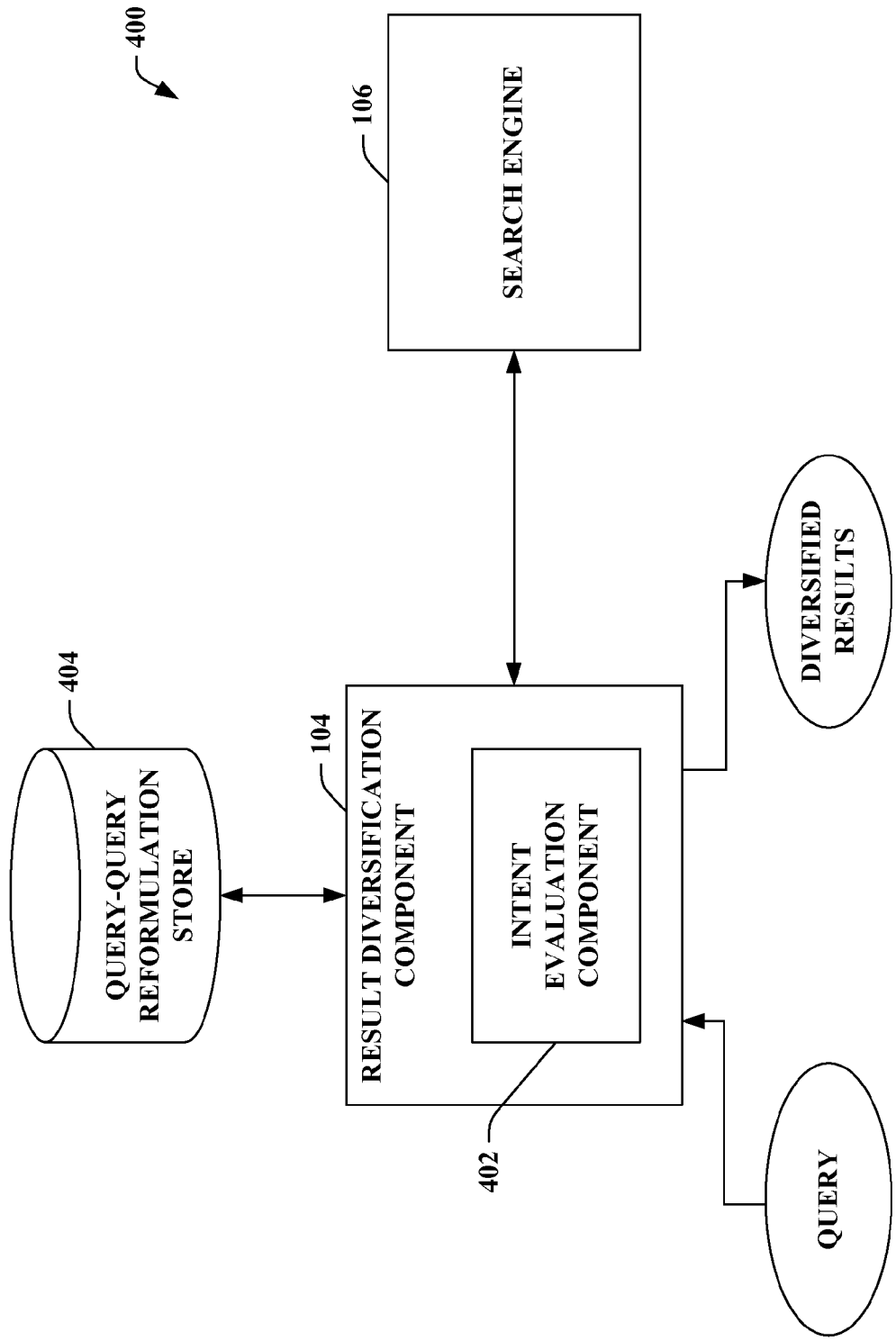
FIG. 4 illustrates a block diagram of an exemplary system that facilitates diversifying a set of search results based upon a consideration of user intent.

With reference to FIG. 4, illustrated is a system 400 that facilitates diversifying a set of search results based upon a consideration of user intent. The system 400 includes the result diversification component 104 that enables increasing an amount of diversity within a set of search results obtained with the search engine 106. The result diversification component 104 can further include an intent evaluation component 402 that introduces diversity into the search results based upon a consideration of different user intents (e.g., a dimension of diversity). Further, the system 400 can include a query-query reformulation store 404 that can store information associated with queries performed by a multitude of users; the information from the query-query reformulation store 404 can be employed by the intent evaluation component 402 (and/or the result diversification component 104 or the search engine 106).

The intent evaluation component 402 facilitates understanding a user's intention associated with performing each query. The intent evaluation component 402 can measure user intention by utilizing a large collection of query-query reformulation patterns that can be stored in the query-query reformulation store 404. The query-query reformulation patterns can provide alternative queries related to each received query to be evaluated (e.g., by employing the search engine 106).

For example, the query-query reformulation patterns can be collected over millions of users; thus, the intent evaluation component 402 can employ users' query patterns in the aggregate to facilitate diversifying search results yielded by the search engine 106. By way of illustration and not limitation, some users may issue a query by entering "traffic" and shortly thereafter issue a second query (e.g., reformulation) for "traffic music", while disparate users may issue the "traffic" query followed by a different second query (e.g., reformulation) for "traffic report Washington."

The intent evaluation component 402 can employ the query-query reformulation patterns to modify a query. Pursuant to an example, a query for 100 results pertaining to "traffic" can be obtained by the result diversification component 104. The intent evaluation component 402 can modify the query to request 10 results related to the original query (e.g., "traffic"), 10 results associated with one reformulation (e.g., "traffic music"), 10 results related to a different reformulation (e.g., "traffic report Washington"), and so on; thus, diversity within the set of results can be enhanced since the returned results can relate to the original query in addition to various reformulations of the query. Although not depicted, it is contemplated that the diversified results can be provided to a personalization component (e.g., the personalization component 202 of FIG. 2); thus, a subset of the diversified results can be provided to a user, the diversified results can be reorder, etc.

The intent evaluation component 402 can select reformulations of queries from the query-query reformulation store 404 in any manner. By way of illustration, the intent evaluation component 402 can utilize the most frequent follow-up queries associated with the original query. Thus, the k most frequent reformulations can be employed in accordance with this illustration.

According to another example, the intent evaluation component 402 can utilize frequent but different query reformulations. The intent evaluation component 402 can identify the most frequent query reformulations. Further, the intent evaluation component 402 can evaluate similarities between such reformulations and exclude reformulations determined to be too similar. For instance, for a query "traffic", one reformulation may be "traffic report Washington", and another reformulation may be "traffic report Seattle Washington." The intent evaluation component 402 can determine that "traffic report Washington" and "traffic report Seattle Washington" are very similar; thus, the intent evaluation component 402 can exclude one of these reformulations (e.g., one with a lower frequency) and thereby allow for a disparate reformulation (e.g., "traffic music") to be utilized. The intent evaluation component 402 can evaluate a similarity between reformulations based upon a scoring metric (e.g., symmetric score, asymmetric score), a word and/or character level overlap, and the like.

Pursuant to further example, the intent evaluation component 402 can utilize frequent and satisfying reformulations, which can be queries that are not frequently reformulated. For instance, for a series of queries such as "traffic", "traffic report Washington" and "traffic report Seattle Washington", the query for "traffic report Washington" may oftentimes be reformulated due to associated ambiguity, while the query for "traffic report Seattle Washington" may be a terminal query that is rarely reformulated. According to this example, the intent evaluation component 402 can identify and employ frequent and satisfying reformulations (e.g., utilize the "traffic report Seattle Washington" reformulation and refrain from employing the "traffic report Washington" reformulation).

Figure 5:
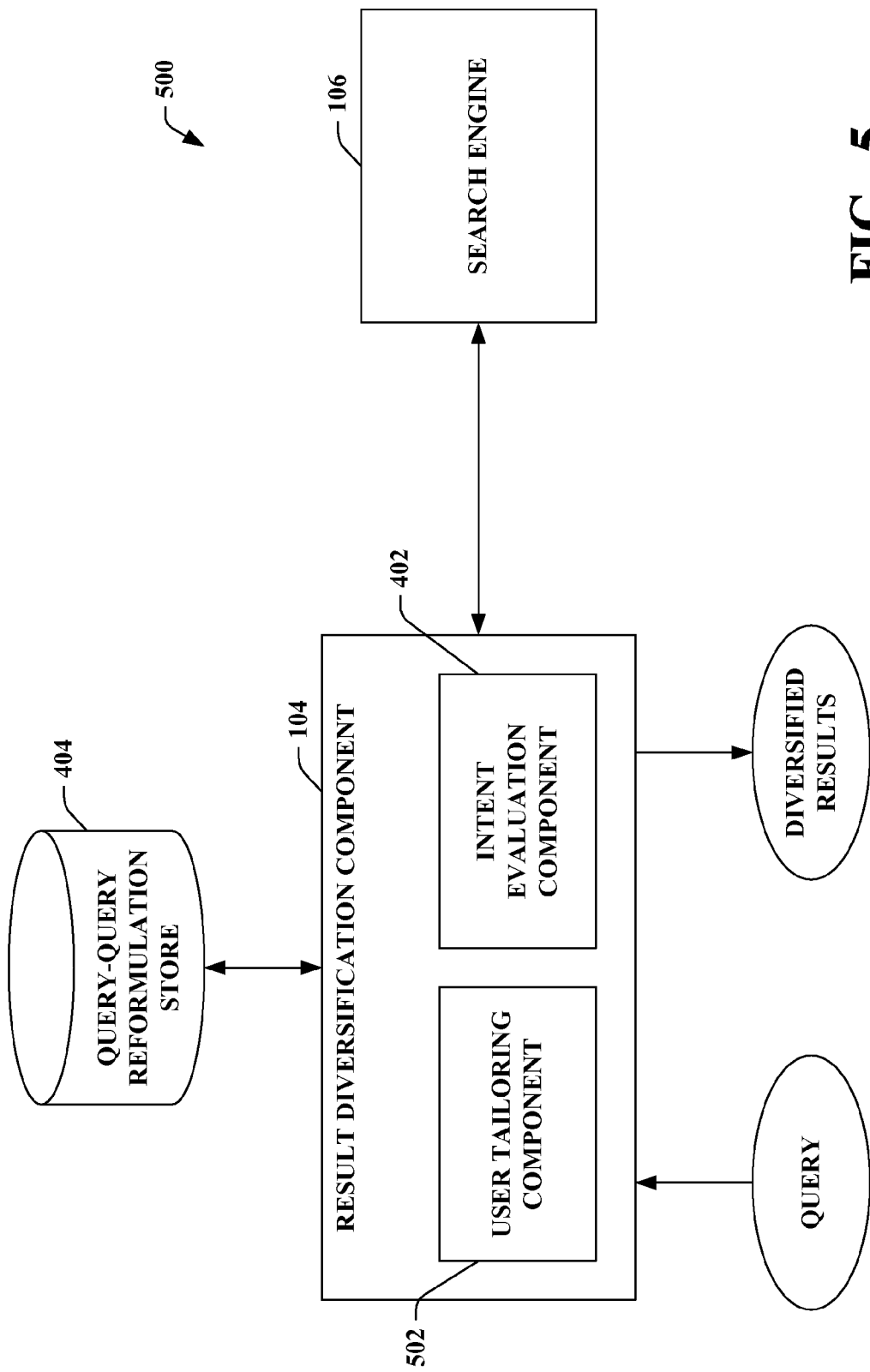
FIG. 5 illustrates a block diagram of an exemplary system that facilitates providing variations within a set of search results based upon user intent evinced by similar users.

Referring to FIG. 5, illustrated is a system 500 that facilitates providing variations within a set of search results based upon user intent evinced by similar users. The system 500 includes the result diversification component 104 that further comprises the intent evaluation component 402. Additionally, the system 500 includes the search engine 106 and/or the query-query reformulation store 404. The result diversification component 104 can further include a user tailoring component 502 that can identify a profile, interests, a context, etc. associated with a user effectuating a query. Further, the user tailoring component 502 can modify the query based upon query-query reformulations employed by users with similar profiles, interests, contexts, and the like.

According to an example, the user tailoring component 502 can determine a user's interests (e.g., by evaluating user history, a current context, recent communications, a profile, demographic information, . . . ). Thereafter, the user tailoring component 502 can identify reformulations stored within the query-query reformulation store 404 conducted by any number of users with similar interests. Thereafter, the intent evaluation component 402 can utilize the identified reformulation related information in connection with the search engine 106 to yield a set of diversified results. Thus, the user tailoring component 502 can enable employing a subset of the data from the query-query reformulation store 404 to generate the set of search results. Further, one skilled in the art would appreciate that a component similar to the user tailoring component 502 can be employed in connection with any disparate system described herein.

Figure 6:
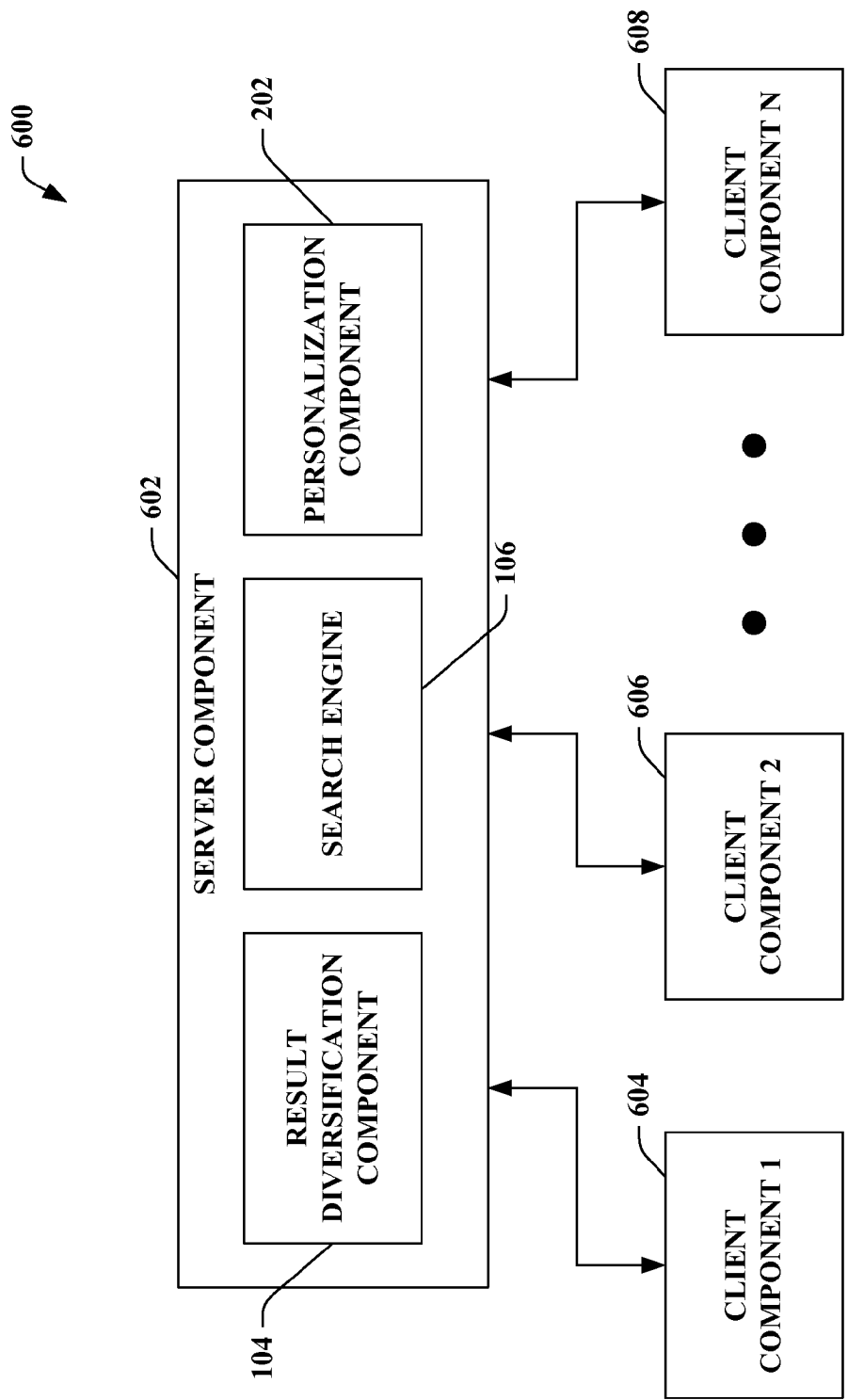
FIG. 6 illustrates a block diagram of an exemplary system that diversifies and/or personalizes search results on a server side.

Turning to FIG. 6, illustrated is a system 600 that diversifies and/or personalizes search results on a server side. The system 600 includes a server component 602 that can communicate with any number of client components (e.g., client component 1 604, client component 2 606, client component N 608, where N can be any integer). The server component 602 can further include the result diversification component 104, the search engine 106 and/or the personalization component 202.

The server component 602 can obtain data from the client components 604-608. For instance, the server component 602 can receive queries effectuated by users employing the client components 604-608. Additionally or alternatively, the server component 602 can obtain profile and/or demographic information to facilitate personalizing search results for an end user by way of employing the personalization component 202. The result diversification component 104 can enable returning a diverse set of search results obtained with the search engine 106 and/or a personalized set of search results yielded by the personalization component 202. By way of example, the server based approach can enable personalization to be provided at numerous locations with relative uniformity as compared to client side personalization; however, the client side approach also falls within the scope of the claimed subject matter.

Figure 7:
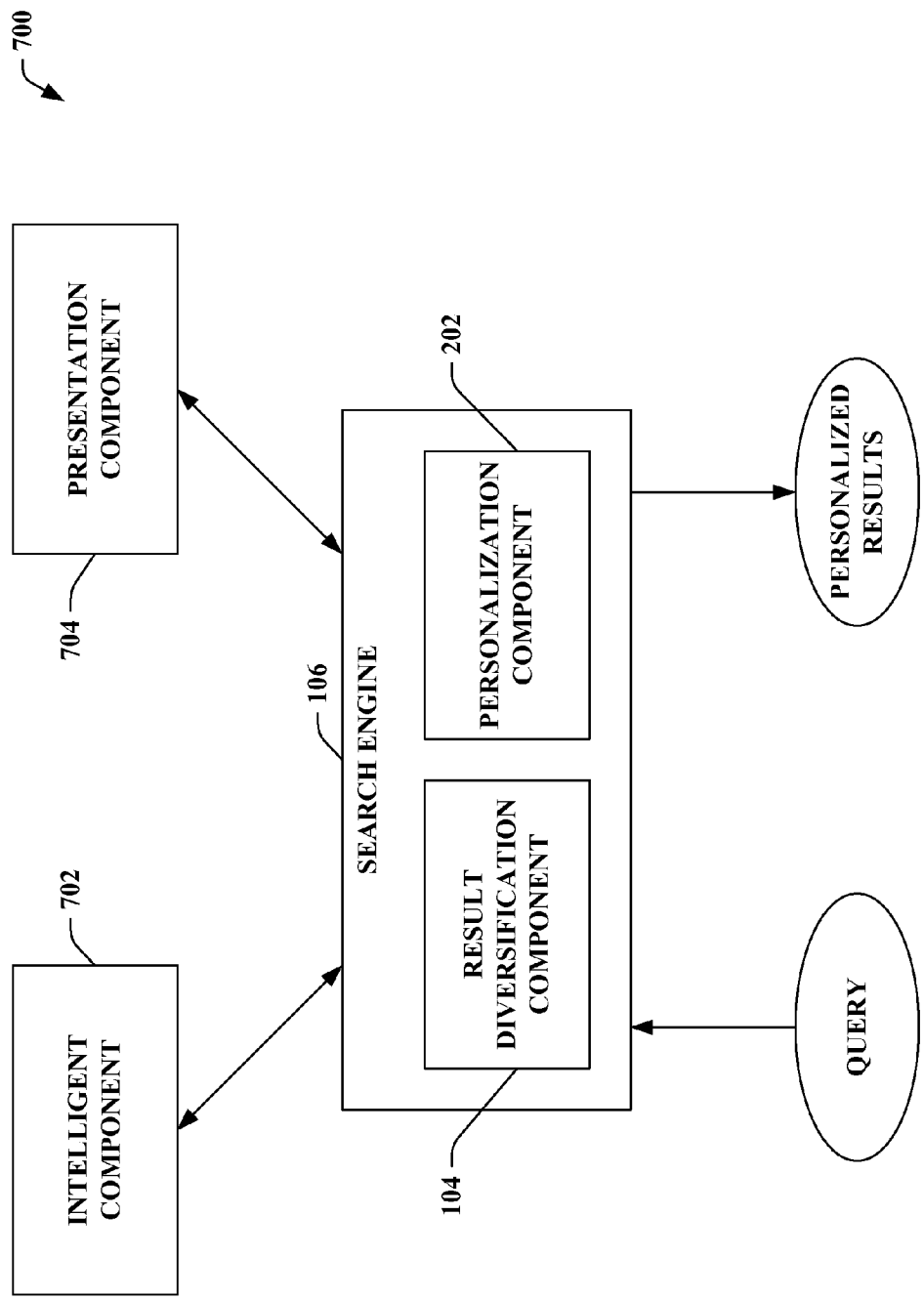
FIG. 7 illustrates a block diagram of an exemplary system that facilitates improving search and/or personalization by way of increasing search result diversity.

Turning to FIG. 7, illustrated is a system 700 that facilitates improving search and/or personalization by way of increasing search result diversity. The system 700 can include the search engine 106, the result diversification component 104, and the personalization component 202, each of which can be substantially similar to respective components described above. As depicted, the search engine 106 includes the result diversification component 104 and the personalization component 202; however, it is to be appreciated that the result diversification component 104 and/or the personalization component 202 can be separate components. The system 700 can further include an intelligent component 702. The intelligent component 702 can be utilized by the search engine 106 to facilitate yielding a diverse set of search results. For example, the intelligent component 702 can determine a level of diversity to utilize in connection with a set of search results obtained with the search engine 106. Pursuant to another illustration, the intelligent component 702 can determine which dimension(s) of diversity to employ to yield variations within the set of search results.

It is to be understood that the intelligent component 702 can provide algorithms for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various logical and statistical classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A presentation component 704 can provide various types of user interfaces to facilitate interaction between a user and any component coupled to the search engine 106. As depicted, the presentation component 704 is a separate entity that can be utilized with the search engine 106. However, it is to be appreciated that the presentation component 704 and/or similar view components can be incorporated into the search engine 106 (and/or the result diversification component 104, the personalization component 202, or the interface component 102 of FIG. 1) and/or a stand-alone unit. The presentation component 704 can provide one or more graphical user interfaces (GUIs), command line interfaces, and the like.

Figure 8:
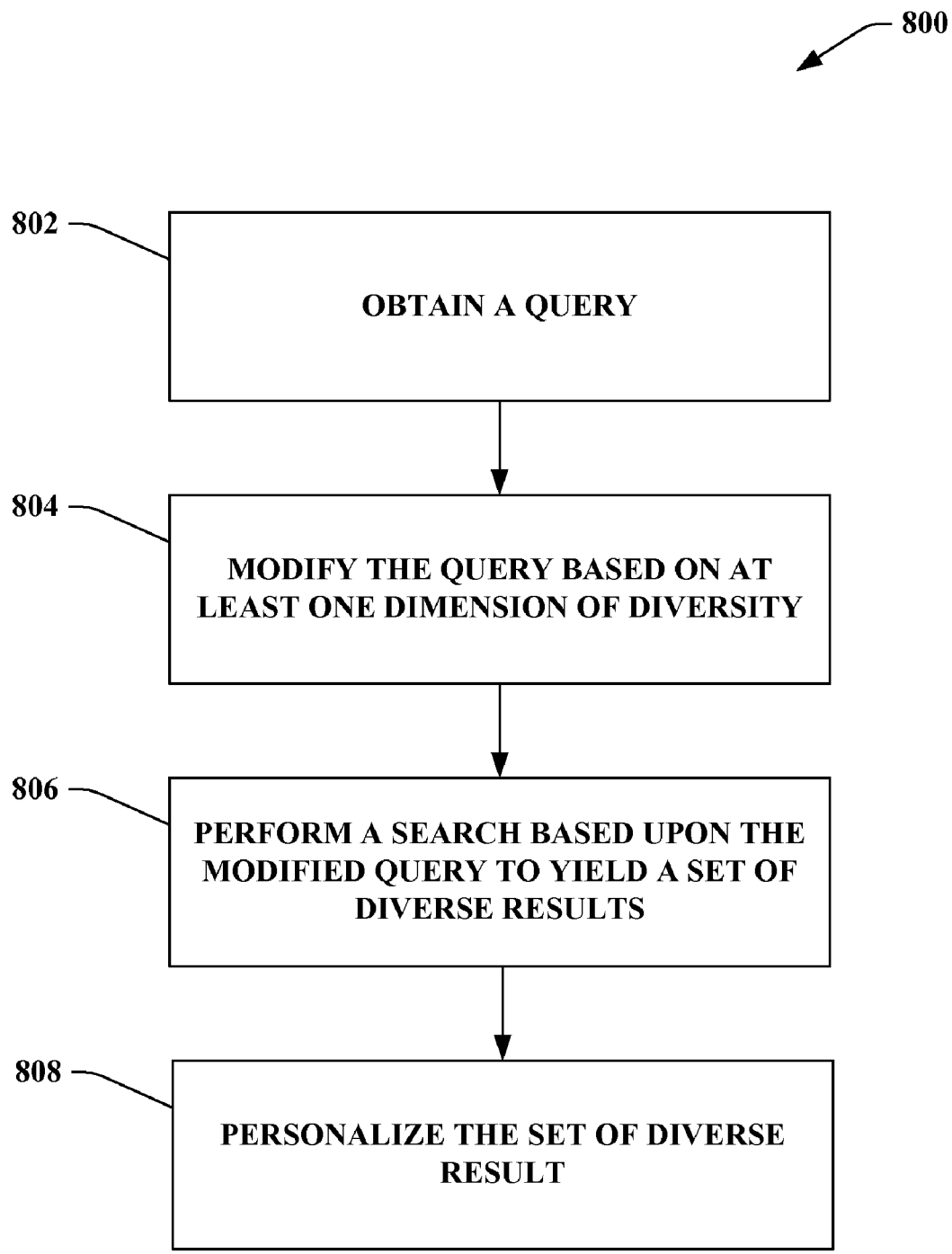
FIG. 8 illustrates an exemplary methodology that facilitates generating a diverse set of search results related to a query.
Figure 9:
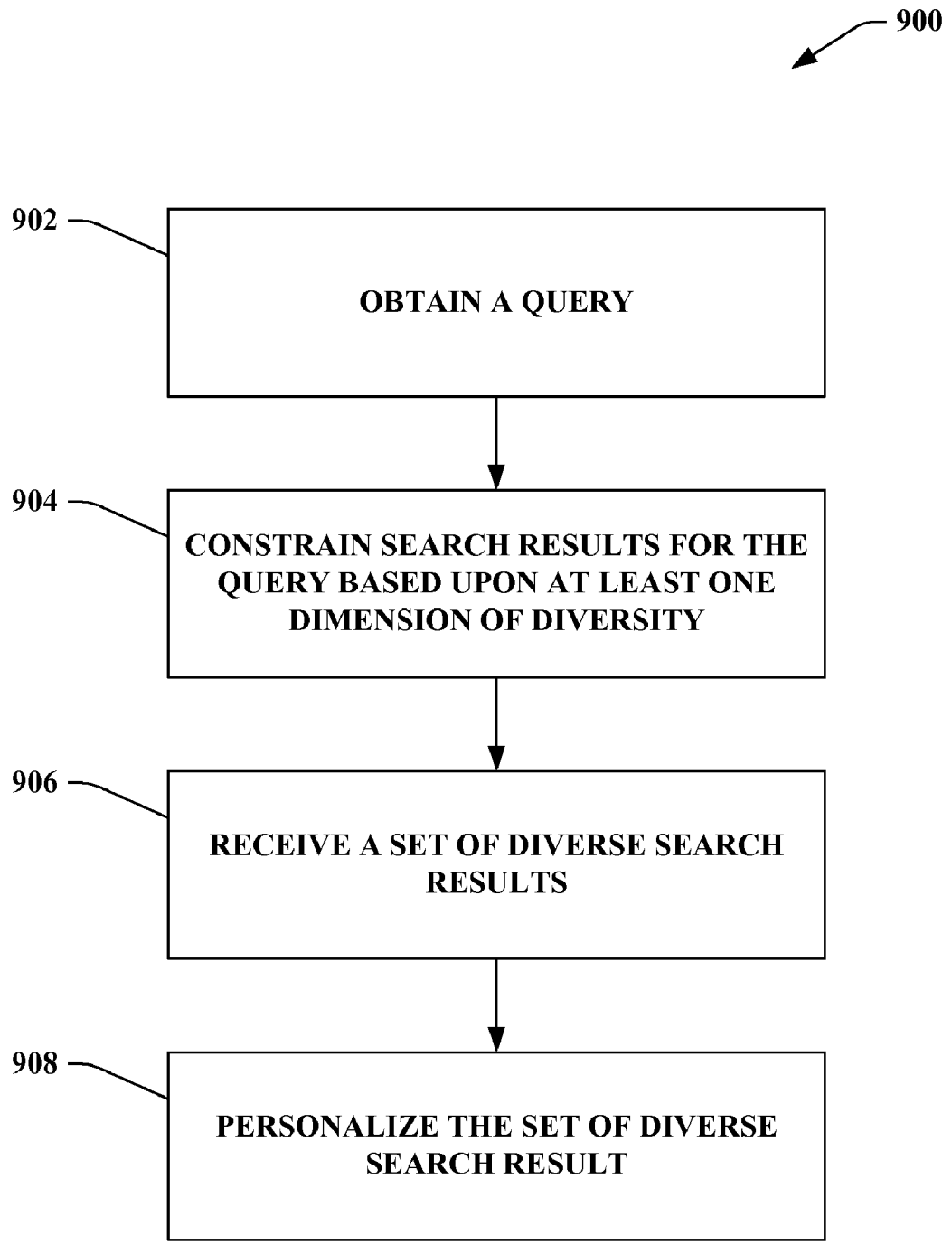
FIG. 9 illustrates an exemplary methodology that facilitates personalizing a set of diverse search results.

FIGS. 8-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

Turning to FIG. 8, illustrated is a methodology 800 that facilitates generating a diverse set of search results related to a query. At 802, a query can be obtained. The query can be provided by a user, for instance. It is to be appreciated that any type of query can be received including, but not limited to, keyword(s), portion(s) of word(s), sound(s), image(s), etc. At 804, the query can be modified based on at least one dimension of diversity. The dimension of diversity can be employed to increase the diversity of the results obtained in response to the query and thereby improve a likelihood of including results relevant to the user. The dimension of diversity can be related to a document and/or a user intent. For example, the dimension of diversity can be associated with document topic, document type, document genre, domain of document, document age, location associated with the document, commercial characteristics of the document, user intent, and the like. Pursuant to a further illustration, a dimension of diversity related to user intent can employ data associated with query-query reformulation patterns. Thus, the obtained query can be modified to request results pertaining to the original query as well as results related to reformulations of the original query. The reformulations can be selected based upon a consideration of the most frequent reformulations, frequent but different reformulations and/or frequent and satisfying reformulations; however, the claimed subject matter is not so limited. At 806, a search can be performed based upon the modified query to yield a set of diverse results. At 808, the set of diverse results can be personalized (e.g., by re-ordering results, selecting a subset of results, . . . ).

With reference to FIG. 9, illustrated is a methodology 900 that facilitates personalizing a set of diverse search results. At 902, a query can be obtained. At 904, search results for a query can be constrained based upon at least one dimension of diversity. By way of illustration and not limitation, the search results can be constrained to include fewer than N results associated with a particular topic (or any disparate dimension of diversity), where N can be any integer. For instance, the query can be modified to include information associated with the constraint. Additionally or alternatively, constraint related information can be provided separately. At 906, a set of diverse search results can be received. At 908, the set of diverse search results can be personalized. For example, a subset of search results can be output and/or the search results can be re-ranked based upon a model pertaining to the particular user. The model can reflect the interests of the user and can be built upon considerations of a computing context, a history of previously encountered content and/or web pages/sites, user interactions, a profile, and/or demographic information.

Figure 10:
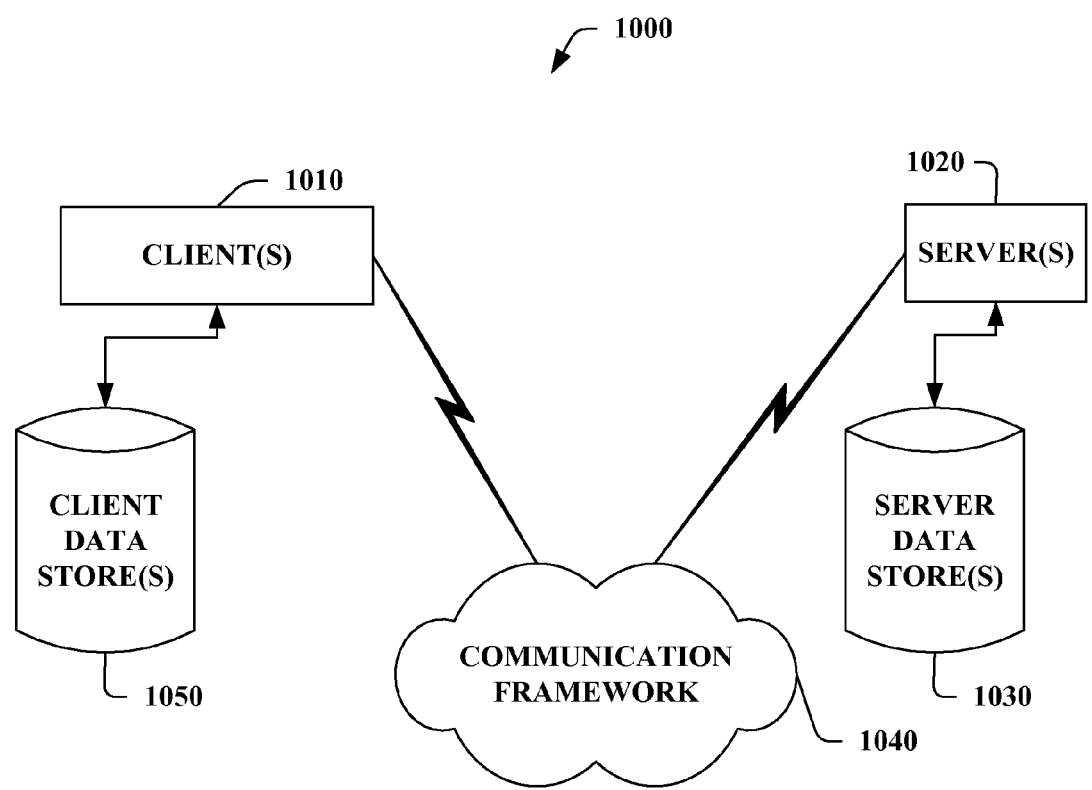
FIG. 10 illustrates an exemplary networking environment, wherein the novel aspects of the claimed subject matter can be employed.
Figure 11:
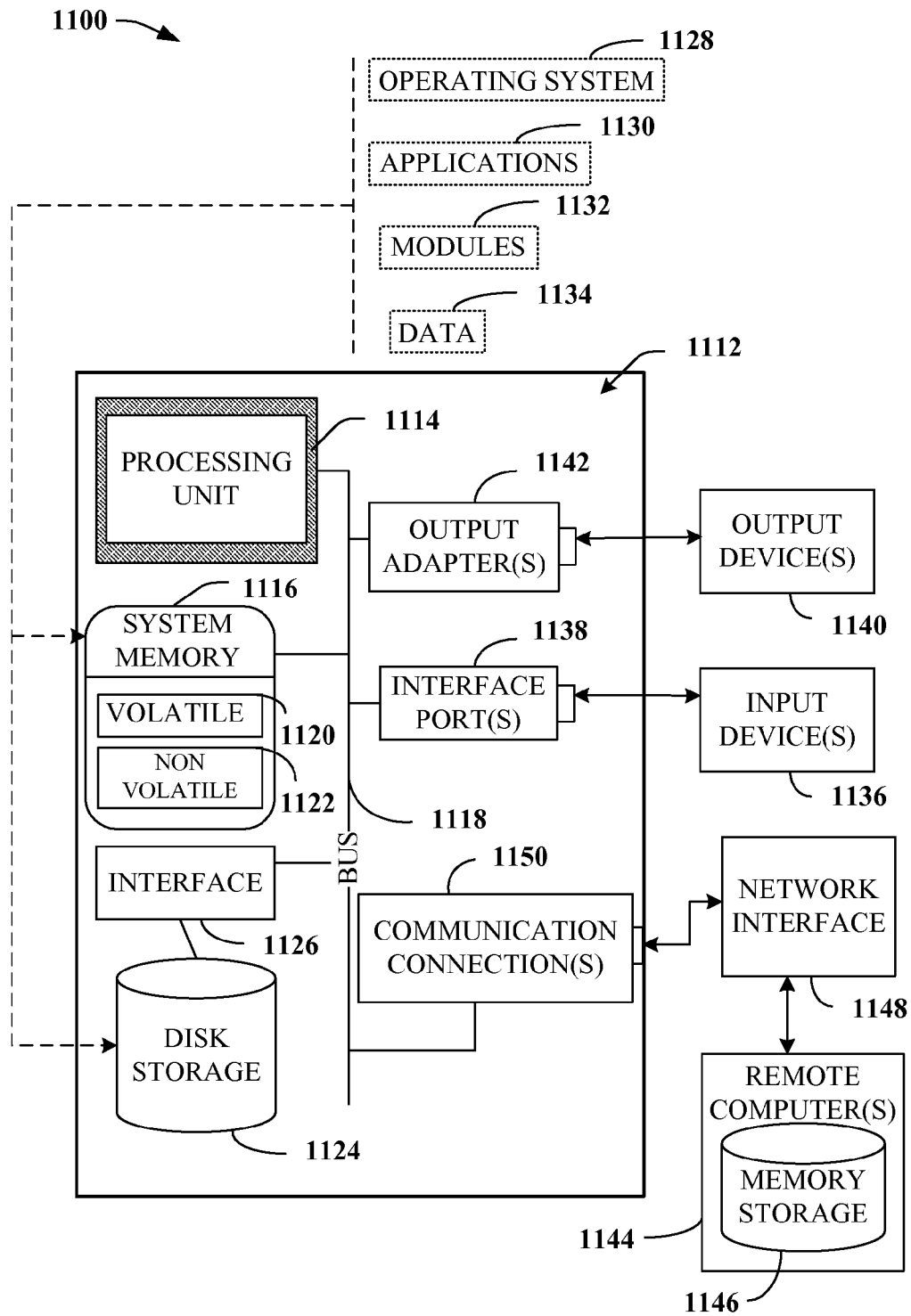
FIG. 11 illustrates an exemplary operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates varying search results, comprising:
    a computer executable interface component that receives a query from a device employed by a first user at a physical location;
    a computer executable result diversification component that modifies a diversity represented by a set of search results obtained by a search engine in response to the query based at least in part upon one or more of a plurality of dimensions of diversity such that at least a predetermined number of results for one or more categories associated with each of the one or more of the plurality of dimensions of diversity are included in the result set, wherein:
        the plurality of dimensions of diversity including document topics, document types, document genres, sites or domains of documents, document ages, locations associated with the documents, commercial characteristics of the documents, and user intents,
        the result diversification component alters the query and provides the altered query to the search engine to request search results associated with each of the one or more dimensions of diversity,
        each dimension of diversity being associated with one or more disparate query-query reformulations of the received query performed by users of the search engine, and
        attributes of documents returned on prior searches performed on the search engine, the result diversification component further combining search results obtained for each of the one or more dimensions of diversity into a first set of search results;
    a computer executable personalization component that generates, from the first set of search results, a set of search results personalized to the first user comprising results relating to one or more of the dimensions of diversity determined to be meaningful to the first user based at least in part on content previously encountered by the first user, the personalization component further employing the device from which the query is received to generate the set of search results personalized to the first user; and
    a processor configured to execute the computer executable components.

2. The system of claim 1, the result diversification component enforces a constraint for the set of search results related to the one or more dimensions of diversity.

3. The system of claim 1, the personalization component utilizes a model pertaining to the user that reflects the user's interests or characteristics.

4. The system of claim 1, the personalization component generates the set of personalized results further based upon at least one of the first user's physical location, a computing context, a history of previously encountered content, a history of previously encountered web pages, user interactions with content, a profile of user interests, and demographic information associated with the user.

5. The system of claim 1, further comprising an attribute differentiation component that provides the one or more dimensions of diversity that distinguish documents.

6. The system of claim 1, further comprising an intent evaluation component that introduces diversity into the set of search results based upon a consideration of user intent.

7. The system of claim 6, user intent being evinced by query-query reformulation patterns.

8. The system of claim 7, the intent evaluation component identifies alternative queries from the query-query reformulation patterns to effectuate in combination with the obtained query.

9. The system of claim 7, the query-query reformulation patterns include information collected from a number of users related to issued queries followed by disparate queries issued shortly thereafter.

10. The system of claim 7, the intent evaluation component selects query-query reformulations based upon at least one of most frequent reformulations, frequent but different reformulations, and frequent and satisfying reformulations.

11. The system of claim 7, further comprising a user tailoring component that modifies the query based upon query-query reformulations employed by users with at least one of similar profiles, interests, and contexts.

12. A method that facilitates generating a diverse set of search results, comprising:
    obtaining a query from a device employed by a first user at a physical location;
    selecting disparate query-query reformulations of the query performed by users of a search engine;

determining one or more of a plurality of dimensions of diversity based on the disparate query-query reformulations, the plurality of dimensions of diversity including document topics, document types, document genres, sites or domains of documents, document ages, locations associated with the documents, commercial characteristics of the documents, and user intents;

for each of the determined one or more dimensions of diversity:
specifying a minimum number of search results to be returned for one or more categories associated with the dimension of diversity;
modifying the obtained query to generate at least the minimum number of search results by employing a query-query reformulation associated with the dimension of diversity;

providing the modified query to the search engine;

combining search results yielded for each of the determined one or more dimensions of diversity into a set of diverse search results;

personalizing the set of diverse search results to the first user, the personalizing comprising generating, from the set of diverse search results, a set comprising search results which relate to one or more of the dimensions of diversity that are determined to be meaningful to the first user based at least in part on content previously encountered by the first user, the personalizing further employing the first user's physical location at the time the query is obtained; and producing the diverse search results comprising the minimum number of results for each of the dimensions of diversity.

13. The method of claim 12, further comprising:
employing query-query reformulation patterns to generate diversity related to user intent; and
modifying the obtained query to request results pertaining to the obtained query and reformulations of the obtained query.

14. The method of claim 12, wherein the personalizing the set of diverse results comprises at least one of identifying a subset of the diverse results to output and reordering the set of diverse results.

15. The method of claim 12, the step of producing diverse search results further comprises:
evaluating similarity between the query-query reformulations;
generating diversity among the minimum number of results by excluding duplicates from the query-query reformulations determined to be similar to each other.

16. The method of claim 13, further comprising selecting the reformulations based upon at least one of most frequent reformulations, frequent but different reformulations, and frequent and satisfying reformulations.

17. A computer-implemented system that enables personalizing search results, comprising:
means for receiving a query from a device employed by a first user at a physical location;
processing means for modifying the query to diversify search results obtained from a search engine for the query based upon a plurality of dimensions of diversity, the processing means specifying a predetermined minimum number of results to be included for each of one or more of the plurality of dimensions of diversity, the plurality of dimensions of diversity including document topics, document types, document genres, sites or domains of documents, document ages, locations associated with the documents, commercial characteristics of the documents, and user intents, each of the one or more dimensions of diversity being associated with one or more query-query reformulations performed by users of the search engine and attributes of documents returned on prior searches performed by the search engine;
means for receiving search results associated with each of the one or more dimensions of diversity and for combining the search results into diverse search results; and
processing means for personalizing the diverse search results to the first user, the processing means generating, from the diverse search results, a set comprising search results relating to one or more of the dimensions of diversity that are determined to be meaningful to the first user based at least in part on content previously encountered by the first user, the processing means further employing at least one of the user's physical location and the device from which the query is received to perform the personalization.

* * * * *